United States Patent [19]

Dvorkis et al.

[11] Patent Number: 5,508,504
[45] Date of Patent: Apr. 16, 1996

[54] WAND TYPE OPTICAL READER

[75] Inventors: Paul Dvorkis, Stony Brook; David Goren, Ronkonkoma, both of N.Y.

[73] Assignee: Symbol Technologies, Inc., Bohemia, N.Y.

[21] Appl. No.: 310,747

[22] Filed: Sep. 22, 1994

Related U.S. Application Data

[62] Division of Ser. No. 100,200, Aug. 2, 1993, Pat. No. 5,369,262, which is a division of Ser. No. 892,889, Jun. 3, 1992, abandoned.

[51] Int. Cl.$^6$ ........................................... G06K 7/10
[52] U.S. Cl. .................................... 235/472; 250/227.13
[58] Field of Search ................................. 235/472, 462, 235/454, 455, 469, 236; 250/227.13, 227.11

[56] References Cited

U.S. PATENT DOCUMENTS

| | | | |
|---|---|---|---|
| 4,180,204 | 12/1979 | Keonig et al. | 382/598 |
| 4,251,798 | 2/1981 | Swartz et al. | 235/472 |
| 4,263,592 | 4/1981 | Takahashi et al. | 235/472 |
| 4,329,684 | 5/1982 | Monteath et al. | 235/462 |
| 4,545,023 | 10/1985 | Mizzi | 250/668 |
| 4,581,761 | 4/1986 | Ichinokawa et al. | 382/59 X |
| 4,672,215 | 6/1987 | Howard | 250/560 |
| 4,675,531 | 6/1987 | Clark et al. | 364/919 |
| 4,748,318 | 5/1988 | Bearden et al. | 235/472 |
| 4,806,745 | 2/1989 | Oogita | 235/492 |
| 4,816,660 | 3/1989 | Swartz et al. | 235/472 |
| 4,906,843 | 3/1990 | Jones et al. | 235/472 |
| 4,916,308 | 4/1990 | Meadows | 235/380 |
| 4,916,441 | 4/1990 | Gombrich | 345/169 |
| 4,916,699 | 4/1990 | Ohashi | 371/17 |
| 4,931,019 | 6/1990 | Park | 83/367 |
| 4,972,496 | 11/1990 | Sklarew | 382/13 |
| 5,021,640 | 6/1991 | Muroi | 235/462 |
| 5,047,625 | 9/1991 | Iima et al. | 250/216 |
| 5,063,508 | 11/1991 | Yamada et al. | 364/419.03 |
| 5,080,456 | 1/1992 | Katz et al. | 235/472 X |
| 5,142,131 | 8/1992 | Collins, Jr. et al. | 235/472 |
| 5,189,291 | 2/1993 | Siemiatkowski | 235/462 |
| 5,300,762 | 4/1994 | Roske | 235/472 |
| 5,308,964 | 5/1994 | Kubuo | 235/472 |
| 5,331,143 | 7/1994 | Marom et al. | 235/472 |
| 5,352,922 | 10/1994 | Barkan et al. | 235/462 X |

FOREIGN PATENT DOCUMENTS

| | | | |
|---|---|---|---|
| 5074634 | 6/1980 | Japan | 345/179 |
| 0153482 | 11/1981 | Japan | 235/472 |
| 2103688 | 4/1990 | Japan | 235/462 |

OTHER PUBLICATIONS

IBM Technical Disclosure Bulletin, "Light Shield for Optical Wand", Minov et al., Mar. 1978.
"SDT–New Scanning Data Terminal Supports Both Bar Code Reading and Manual Data Entry." *Symbol MSI*, ©1989.

*Primary Examiner*—Donald T. Hajec
*Assistant Examiner*—Le Thien Minh
*Attorney, Agent, or Firm*—Lowe, Price, LeBlanc & Becker

[57] ABSTRACT

A laser wand for reading optically encoded indicia has a wand shaped housing for housing a light emitter which for emits a focussed laser light beam having a fixed focal point beyond which said light beam diverges. The light beam is directed towards a surface on which the indicia is disposed. A spacer is also provided for alternatively defining different separation distances between the light emitter and indicia. At a first separation distance, the light beam forms a sensing spot of a first size on the surface on which the indicia is disposed. This sensing spot is effective for reading indicia having a first physical characteristic. At a second separation distance, the light beam forms a sensing spot of a second size, which is larger than the first size, on the surface on which the indicia is disposed. This later sensing spot is effective for reading indicia having a second physical characteristic different from the first physical characteristic. For example, indicia having the first physical characteristic may be of a higher density than indicia having the second physical characteristic.

20 Claims, 3 Drawing Sheets

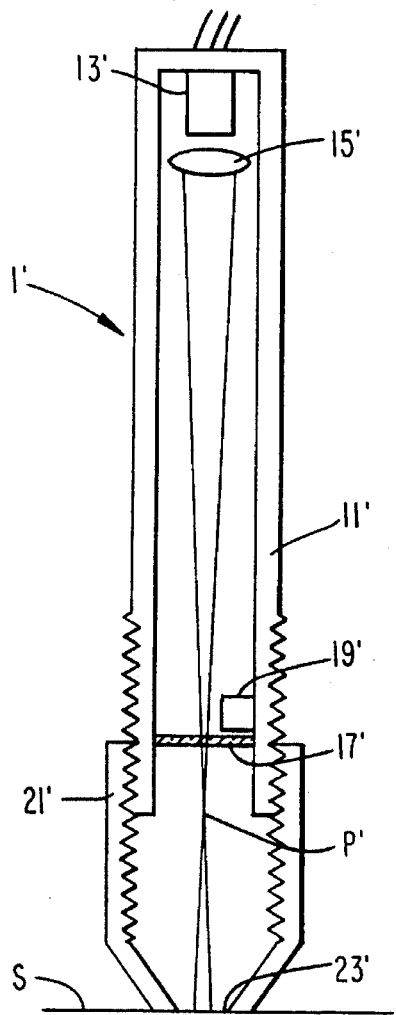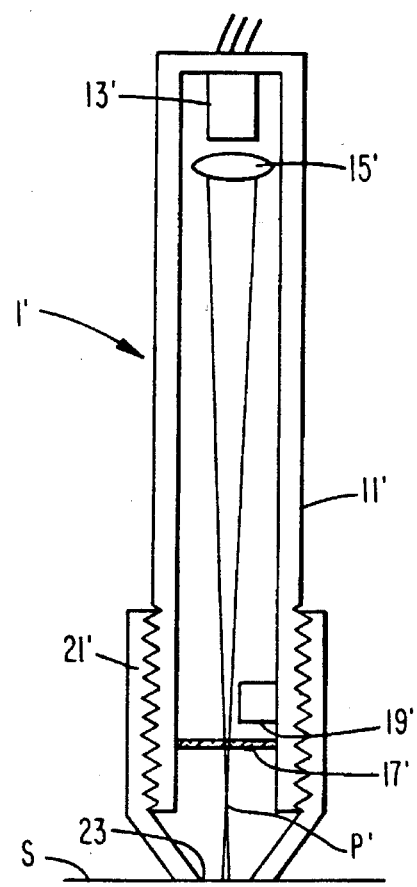
FIGURE 2A
FIGURE 2B

WAND TYPE OPTICAL READER

This application is a division of application Ser. No. 08/100,220 filed Aug. 2, 1993 now U.S. Pat. No. 5,369,262, which is a division of application Ser. No. 07/892,889 filed Jun. 3, 1992, now abandoned.

TECHNICAL FIELD

The instant invention relates to devices for reading optically encoded information of varying densities, for example bar codes, and to associated data input devices.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicates the encoded information. A specified number and arrangement of these elements represents a character. Standardized encoding schemes specify the arrangements for each character, the acceptable widths and spacings of the elements the number of characters a symbol may contain or whether symbol length is variable, etc.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. As the wand passes over the bar code, the emitter and associated optics produce a light spot which impacts on the code, and the detector senses the light reflected back from the light spot passing over each symbol of the code. Alternatively, an optical moving spot scanner scans a light beam, such as a laser beam, across the symbol; and a detector senses reflected light from the beam spot scanned across the symbol. In each case, the detector produces the analog scan signal representing the encoded information.

A digitizer processes the analog signal to produce a pulse signal where the widths and spacings between the pulses correspond to the widths of the bars and the spacings between the bars. The pulse signal from the digitizer is applied to a decoder which first determines the pulse widths and spacings of the signal from the digitizer. The decoder then analyzes the widths and spacings to find and decode a legitimate bar code message. This includes analysis to recognize legitimate characters and sequences, as defined by the appropriate code standard.

Different bar codes have different information densities and contain a different number of elements in a given area representing different amounts of encoded data. The denser the code, the smaller the elements and spacings. Printing of the small size denser symbols on an appropriate medium is exacting and thus is more expensive than printing large size low resolution symbols.

A bar code reader typically will have a specified resolution, often expressed by the size of its effective sensing spot. The resolution of the reader is established by parameters of the emitter or the detector, by lenses or apertures associated with either the emitter or the detector, by the threshold level of the digitizer, by programming in the decoder, or by a combination of two or more of these elements.

In a laser beam scanner, the effective sensing spot may correspond to the size of the beam at the point it impinges on the bar code. In a wand using an LED or the like, the spot size can be the illuminated area, or the spot size can be that portion of the illuminated area from which the detector effectively senses light reflections. By whatever means the spot size is set for a particular reader, the photodetector will effectively average the light detected over the area of the sensing spot. In one prior art example, U.S. Pat. No. 4,675,531 to Clark et al., an LED illuminates the bar code and images the code onto a photodetector. The aperture of the photodetector determines the resolution or "spot size." In the Clarke et al. system the photodetector effectively averages the light detected over the area of the aperture.

A high resolution reader has a small spot size and can decode high density symbols. The high resolution reader, however, may have trouble accurately reading low density symbols because of the lower quality printing used for such symbols. This is particularly true of symbols printed by a dot matrix type printer. The high resolution reader may actually sense dot widths within a bar as individual bar elements. In contrast, a low resolution reader detects an average intensity using a large spot size and can decode low density noisy symbols. However, a reader for relatively noisy symbols of low density, such as the dot matrix symbols, senses and averages such a wide spot that two or more fine bars of a high resolution symbol may be within the spot at the same time. Consequently, a reader having a low resolution, compatible with dot matrix symbols, can not accurately read high density symbols. Thus any reader having a fixed resolution will be capable of reading bar codes only within a limited range of corresponding symbol densities.

Commonly assigned U.S. patent application Ser. No. 07/735,573 filed Jul. 25, 1991, to Barkan et al., discloses a wand or scanner system for reading optically encoded information having a wide range of densities. The system includes either optical or electronic means to derive two or more channels of data from each scan pass of the wand or scanning beam over a bar code. Each channel of data has a different resolution, and the proposed system analyzes data from the two channels to obtain a valid result over a wide range of information densities. The optical and/or electronic solutions proposed in that application, however, are complex. The resulting system becomes costly, and the wand or scanner becomes larger and heavier due to the added components. A large, heavy handheld unit causes fatigue and discomfort when a user must hold and operate the unit for protracted periods.

Clearly a need exists in the art for a bar code reader which can be readily adapted to reading of bar codes over a wide range of symbol densities without adding undue complexity.

Another problem relates specifically to contact wand type bar code readers. Typically, such wands include an LED for emitting light to illuminate the bar code and a lens for focusing the widely divergent light from the LED onto the bar code. In many such wands, the lens is part of the actual tip of the wand, and consequently, the front surface of the lens contacts the surface on which the bar code is formed during scanning of the code symbols. Repeated use of the wand causes wear and scratching of the front surface of the lens. Such damage degrades the optical properties of the lens and reduces performance of the wand. As a result, the lens must be periodically replaced. Physical replacement of the lens, however, is time consuming and costly.

To alleviate these problems, a number of optical readers incorporate a keyboard and an alphanumeric display to form an integrated data entry terminal. These integrated terminals have included both contact wand type bar code readers and pistol grip type moving spot scanners. The data entry capabilities of such integrated terminals, however, have been limited by the nature of the keyboard and display.

A number of other types of data entry devices are known, and in many applications provide more convenient or "user friendly" data entry operation than do keyboards and alphanumeric displays. For example, a mouse allows a computer operator to move a cursor to point at an option illustrated on a display screen. The operator then "clicks" a button on the mouse to select the particular option. The mouse can also provide graphics data input. U.S. Pat. No. 4,906,843 to Jones et al. discloses a combination mouse and optical scanner, but the optical scanner scans characters or graphics data, not optically encoded information such as bar codes. The user manually scans characters by moving the mouse across the surface on which the characters appear.

A number of other keyboardless, data entry terminals have been proposed. U.S. Pat. No. 4,972,496 to Sklarew, for example, discloses a terminal device having a flat transparent input screen for generating input information when an operator contacts the screen with a stylus. A display screen mounted below the input screen displays symbols and graphic information drawn by the stylus. The operator inputs information into the associated computer through pen strokes essentially as if writing on a tablet with a pen. U.S. Pat. No. 4,916,441 to Gombrich discloses a handheld terminal including a non-contact point source type bar code reader and a touch sensitive display screen.

From the above discussion it should be clear that a need still exists to further develop various computer input devices integrated with means to scan optically encoded indicia which also provide convenient operation.

DISCLOSE OF THE INVENTION

Objectives:

One objective of this invention is to provide a bar code reader which is more convenient and efficient to use when reading encoded information over a wide range of densities.

It is a further object of the invention to eliminate contact of the optical elements of the wand with the surface scanned in order to eliminate wear and damage to the optical components.

Summary:

In its simplest form, the reader for all densities comprises a contact type wand including a laser light emitter and a photodetector. The wand housing may be cylindrical with a circular opening at one end. Light from the emitter passes through the opening, reflects off optically encoded information, passes back through the opening and is sensed by the photodetector.

The laser light emitter will normally have some established focusing parameter. As a result, the emitted light beam will diverge at points farther away from the beam focal point. The different diameter of the beam at different distances can be used to establish a different sensing spot size for the wand. The different sensing spot sizes can then be used to efficiently read optically encoded information of different densities. To conveniently space the laser emitter at different distances from the surface of the encoded information, the invention therefore provides a means for contacting a surface on which the optically encoded information is formed. These means, typically in the form of a spacer, selectively define at least two different distances between the focal point of the diverging beam of light and the optically encoded information. Thus, the diverging beam of light will have a specific diameter at its point of impact on the optically encoded information for each of the two distances set by the spacer means, and the specific diameters will be different for each of the two different distances.

In its simplest form, the spacer means includes of the wand tip itself which contacts the encoded information and defines a first distance. At the first distance, the impact point is relatively close to the focal point and to the laser light emitter, the beam has diverged relatively little, and the resulting sensing spot diameter is small. The small sensing spot is effective in reading small bar code symbols, i.e. information of relatively high density. To establish at least one other distance, the spacer means further includes a detachable spacer module. The detachable spacer module can be mounted on the tip of the wand in a manner concentric about the circular opening in the tip. The detachable spacer module also has a tip for contact with the encoded information through which a second circular opening is formed. When attached to the tip of the wand, the detachable spacer module contacts the surface on which the code is formed during scanning across the code. The attached spacer effectively lengthens the wand structure and specifically establishes a second longer distance. At the longer distance, the impact point is relatively far away from the beam focal point and from the laser light emitter. At the impact point, the beam has diverged further, producing a larger diameter sensing spot. The large sensing spot is effective in reading larger and noisier printed bar code symbols. These larger bar code symbols correspond to optically encoded information of relatively low density, such as bar codes produced by a dot matrix printer.

A clear sealing member may be placed at some point within the housing between the opening and the emitter and photodetector. The sealing member prevents dust and dirt from entering. The sealing member is not located at the tip of the wand. The tip of the wand which contacts the surface of the optically encoded information is just an open end of the cylinder. Consequently, there is no optical element at the tip which ever contacts the encoded information, and problems of damaging and replacing such an optical element are eliminated.

The means for contacting the surface can take a variety of forms. For example, these means may comprise a spacer adjustably mounted on the housing of the wand. To change the distance, the spacer position is adjusted. In one example, the spacer may slide on or telescope with respect to the cylindrical wand housing. When the spacer reaches a position appropriate for reading a particular density symbol, the operator secures the spacer at that point by tightening a set screw. Alternatively, the fore end portion of the wand housing and the rear portion of the spacer could have matching threads, in which case the operator turns the spacer to change the position thereof and the overall length of the combined wand and spacer structure.

Typically, the light beam emitted by the scanners of the present invention will be in the visible range of the spectrum, for example red light. Consequently, the beam scan across the code or indicia will be visible to the operator. Also, the decode logic can provide a "beep" signal as an audible output upon detection of a valid read result. The visible beam and the "beep" signal provide feedback to the operator as to the operation of the scanner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 2A and 2B illustrate in cross section a second embodiment of the invention, in the form of a wand type reader, with a second adjustable spacer design set at two different positions to provide two different beam spot sizes.

BEST MODE FOR CARRYING OUT THE INVENTION

Figure 1A:
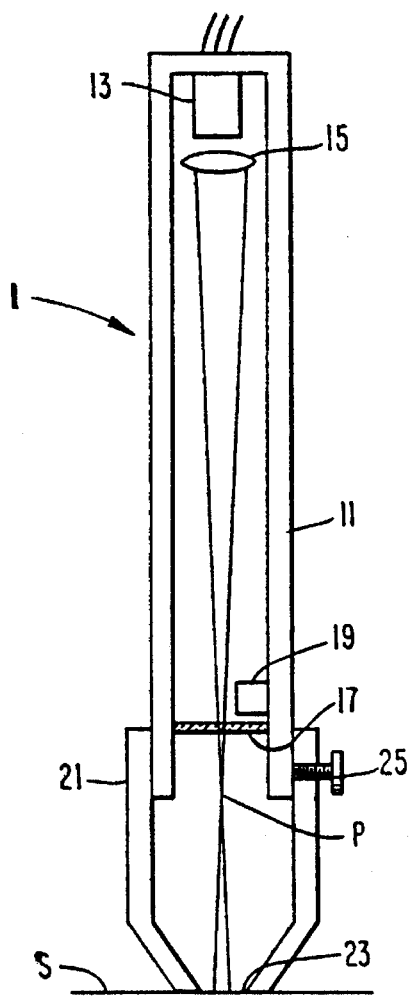
FIGS. 1A and 1B illustrate n cross section a first embodiment of the invention, in the form of a wand type reader, with an adjustable spacer set at two different positions to provide two different beam spot sizes.
Figure 1B:
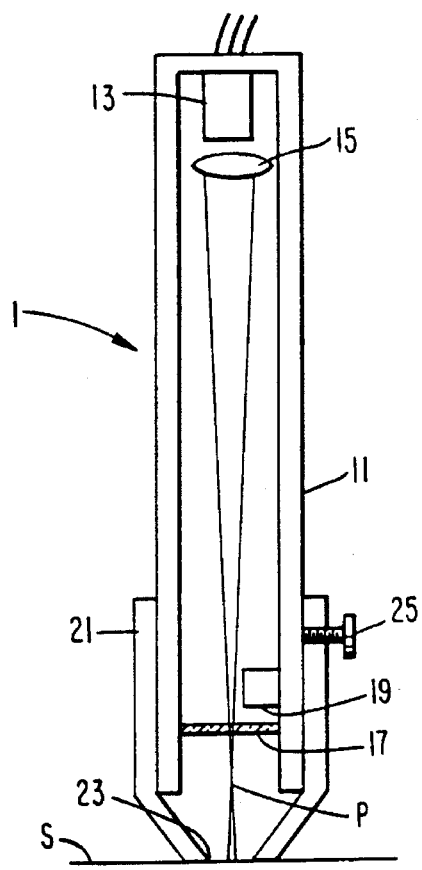

As shown in FIGS. 1A and 1B, the bar code wand 1 of the first embodiment includes a cylindrical housing 11 which contains a light emitter, such as a visible light laser diode (VLD) 13. The VLD 13 emits light which passes through an optical element, such as lens 15. The lens 15 focuses the laser light to a point P. The focused light passes through a transparent member 17 which serves to seal the wand against dust and debris. The housing 11 also contains a light sensitive photodetector 19, located behind the transparent sealing member 17, for sensing light reflected back from information scanned using the wand.

Since the wand uses a focused laser beam, no aperture is needed to define the sensing spot. Instead, the sensing spot of the laser wand corresponds to the size of the area illuminated by the beam and the diameter or spot size of the beam itself at the point where the beam impacts on the surface being scanned. As illustrated by comparison of FIGS. 1A and 1B, as the emitted light passes beyond the focal point P, the light diverges. At points close to the focal point, the beam diameter will be small, whereas at points further beyond the focal point the beam diameter will be larger. Thus, for different distances from the focal point, the beam will produce different size sensing spots which will be effective for reading different sizes and densities of symbols of optically encoded information.

The wand also includes a spacer member 21. The inside diameter of the distal end of the spacer 21 is slightly larger than the outside diameter of the fore end portion of the housing 11. Thus the spacer 21 can be slideably mounted on the fore end portion of the housing 11. When the spacer is in a desired position for reading a particular density, an operator tightens set screw 25 to secure the spacer in position. The fore end of the spacer 21 tapers to a point through which is formed aperture 23. Light from the VLD emerges from the aperture 23.

In use, an operator holds the wand in one hand and places the tip of the wand against the surface S on which is formed the encoded information, e.g. the bar code. To scan the information, the operator moves the wand across the symbols while maintaining contact of the tip of the spacer 21 with the surface S. Because the light beam diverges, the beam spot size at the point where the light impacts on the information surface will be determined by the distance from the focal point.

Comparison of FIG. 1A to FIG. 1B demonstrates how repositioning of the spacer will produce different beam spot diameters on the surface of the information during scanning. In FIG. 1A, the spacer is mounted relatively far forward on the fore end of the housing 11. When the tip of the spacer contacts the surface S, the distance between the focal point P and the surface S is relatively long, and the beam spot is large. The large beam spot would be appropriate for reading low density encoded information, such as dot matrix printed bar codes. In contrast, in FIG. 1B the operator has telescoped the spacer back on the housing. When the tip of the spacer contacts the surface S, the distance between the focal point P and the surface S is relatively short, and the beam spot is small. The small beam spot would be appropriate for reading high density encoded information, such as very small size bar code symbols.

The invention of FIGS. 1A and 1B allows an operator to adjust a single wand to read a range of symbol densities. To change from a setting for one density to a new setting for another density, the operator simply loosens set screw 25, moves the spacer to a new position, tightens the set screw 25 and scans the wand 1 across the optically encoded information. If scanning is unsuccessful, the operator can repeat this procedure at another setting until the scanning is successful.

The second embodiment of the invention, using a threaded spacer structure appears in FIGS. 2A and 2B. Here, the bar code wand 1' includes a housing 11' which contains a VLD 13'. The VLD 13' emits light which passes through the lens 15' and is focused to a point P'. The focused light passes through a transparent member 17' which serves to seal the wand against dust and debris. The housing 11' also contains a detector 19', located behind the transparent sealing member 17, for sensing light reflected back from information scanned using the wand.

The wand also includes a spacer member 21'. The male threaded outer surface of the fore end portion of housing 11' engages the female threaded distal end of the spacer 21'. Thus, the spacer 21' can be screwed onto the fore end portion of the housing 11' until it reaches a desired position for reading a particular density. The fore end of the spacer 21' tapers to a point through which is formed aperture 23'. Light from the VLD and emerges from the aperture 23'.

Comparison of FIG. 2A to FIG. 2B demonstrates how repositioning of the spacer in the second embodiment will produce different beam spot diameters on the surface of the information during scanning. In FIG. 2A, the spacer is threaded to a position relatively far forward on the fore end of the housing 11'. When the tip of the spacer contacts the surface S, the distance between the focal point P' and the surface S is relatively long, and the beam spot is large. In contrast, in FIG. 2B the operator has turned the spacer 21' so that the threads position the spacer relatively far back on the housing 11'. When the tip of the spacer contacts the surface S, the distance between the focal point P' and the surface S is relatively short, and the beam spot is small.

The invention of FIGS. 2A and 2B allows an operator to adjust a single wand to read a range of symbol densities. To change from a setting for one density to a new setting for another density, the operator simply turns the spacer 21' until it reaches a new position, and scans the wand across encoded information. If scanning is unsuccessful, the operator can repeat this procedure at another spacer position until the scanning is successful.

Figure 3A:
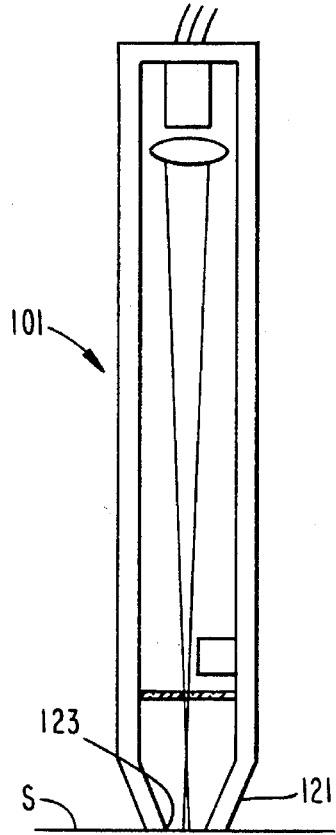
FIGS. 3A, 3B and 3C illustrate in cross section a third embodiment of the invention, in the form of a wand type reader using detachable second spacers of different lengths.
Figure 3B:
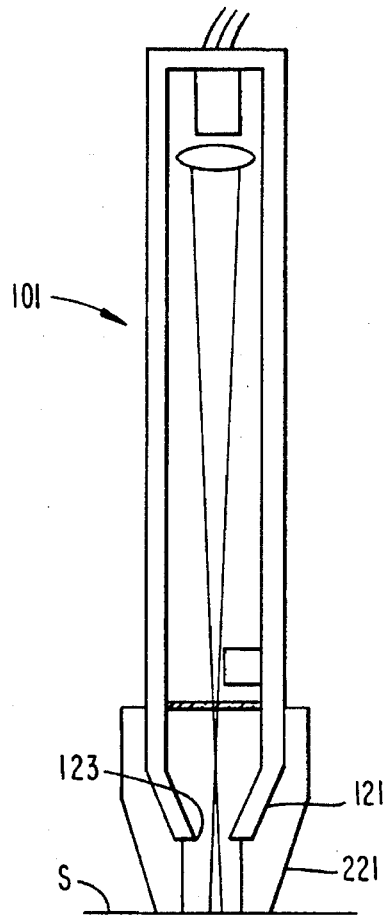
Figure 3C:
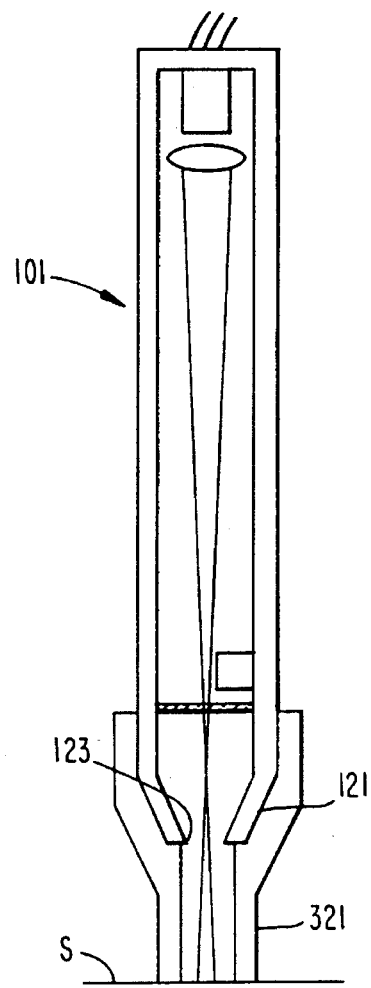

In the third and perhaps the simplest preferred embodiment of the invention, shown in FIGS. 3A–3C, the laser wand 101 has a structure similar to that of the wand used in the earlier described embodiments. For example, the cylindrical wand housing contains a VLD, a lens, a photodetector and a transparent sealing member. In the third embodiment, however, the fore end of the housing is designed for direct contact with the surface S on which the bar code appears. The fore end of the housing tapers, as shown at 121, to a circular aperture 123. The VLD emits light which is focused by the lens and passes through the transparent member to emerge through opening 123. The light will reflect back off of the bar code or other optically encoded information on the surface S, and the photodetector will sense the reflected light.

When the tapered tip 121 of the wand 101 contacts the surface S, during scanning across a code, the distance between the focal point and the surface S is relatively short. Consequently, the beam spot is small, as shown in FIG. 3A. The small beam spot would be appropriate for reading high density encoded information, such as very small size bar code symbols.

To increase the spot size, for example to read lower density bar codes, the operator inserts the fore end of the wand 101 into a spacer 221, as shown in FIG. 3B. The inside diameter of the distal end of the spacer 221 is minimally larger than the outside diameter of the fore end portion of the wand 101. This produces a friction or pressure fit of the spacer 221 on the wand 101. The tension between the spacer and the wand should be sufficient to retain the spacer in place on the tip of the wand during scanning but still allow an operator to manually attach and remove the spacer from the wand.

The spacer 221 serves to lengthen the distance between the focal point and the surface S. With the spacer 221 mounted on the tip of wand 101, the operator contacts the fore end of the spacer to the surface S and scans the wand across the code. The increased distance between the focal point and the surface S causes the spot size of the beam at the point of impact on the surface to increase. FIG. 3B shows that the beam at the point of impact will have a larger diameter than would be the case without the spacer, as shown in FIG. 3A. The larger spot size of FIG. 3B would be suitable for reading of medium density bar code symbols.

To further increase the spot size, to read extremely low density bar codes such as those printed by dot matrix printers, the operator inserts the fore end of the wand 101 into another spacer 321, as shown in FIG. 3C. As with the spacer 221, the spacer 321 is designed to provide a friction or pressure fit of the spacer 321 onto the tip of wand 101. This serves to retain the spacer 321 in place on the tip of the wand 101 but still allows an operator to manually attach and remove the spacer 321 from the wand.

The spacer 321 includes a cylindrical extension on the tip thereof which makes the spacer 321 longer than the spacer 221. This extension can take virtually any shape the designer chooses so long as it increase the length of the spacer by a desired amount. Spacer 321 therefore provides a still longer distance between the focal point and the surface S than did the wand 101 alone (FIG. 3A) or the wand with the spacer 221 attached (FIG. 3B). Again, the increased distance between the focal point and the surface S serves to increase the spot size of the beam at the point where the diverging light beam impacts on the scanned surface S. Comparing FIGS. 3A–3C, it should be clear that the longer distance provided by spacer 321 produces the largest spot size. With the spacer 221 mounted on the tip of wand 101, the operator contacts the fore end of the spacer to the surface S and scans the wand across the code, and during such scanning the larger spot size would adapt the wand to effectively read low density bar code symbols.

In use, an operator adds or changes spacers whenever a scan is unsuccessful, and then tries to scan the code again. This procedure can be repeated, as necessary until the operator finds the correct spacer and spot size for the current code.

Although shown as using two different length detachable spacers 221, 321, more spacers can be provided. For many applications, however, one spacer will be enough. The operator would use the wand without a spacer for small high density symbols and at least some mid-range density symbols. The operator would use the wand with a long spacer, such as spacer 321, for the large low density symbols and the remaining mid-range density symbols. A wire or chain or the like normally connects the spacer or spacers to the housing of the wand, to ensure that the spacers remain with the wand.

In the embodiments of FIGS. 1–3, each spacer or wand tip which contacts the surface comprises only a circular opening. There are not optical elements at the point of contact with the surface. This structure eliminates the problems of damaging an optical element by contact of the element with the surface and the resultant need for element replacement.

Although FIGS. 1–3 show the VLD and the lens as separately mounted elements, they could easily comprise elements of a combined laser and optics assembly. For example, the assembly might include an elongated hollow tube, a laser diode fixedly mounted at one end of the tube, and a lens barrel mounted at the opposite end of the tube. The lens barrel would contain a focusing lens, and if necessary, an aperture stop. Together, the lens and aperture would define the focal point and the beam diameter at various distances beyond the focal point. U.S. Pat. No. 4,816,660 discloses one example of such an assembly.

In each of the above discussed embodiments, the shape of the spacers can vary greatly, to adapt to different bar code reader designs and/or specific information scanning applications. For example, it is possible to adapt the spacer for use on a moving spot type laser scanner.

Typically, the light beam emitted by the scanners of the present invention will be in the visible range of the spectrum, for example red light. Consequently, the beam scan across the code or indicia will be visible to the operator. The decode logic may reside within the same housing as the scanner or the decode logic may be software resident in the associated computer system. The decode logic can provide a "beep" signal as an audible output upon detection of a valid read result. The visible beam and the "beep" signal provide feedback to the operator as to the operation of the scanner.

We claim:

1. A laser wand for reading optically encoded information comprising:

means for producing a focussed laser light beam having a fixed focal point directed toward optically encoded information;

a photodetector for sensing light reflected back from the optically encoded information; and means, coupled to the means for producing the focussed laser light beam, for contacting a surface on which the optically encoded information is formed to selectively define at least two different distances between the means for producing the focussed laser light beam and the optically encoded information, whereby the diameter of the focussed laser light beam at its point of impact on the optically encoded information will be different for each of the two different distances.

2. A laser wand for reading optically encoded information as in claim 1, wherein the focussed laser light beam diverges beyond said fixed focal point.

3. A laser wand for reading optically encoded information as in claim 2, wherein the means for producing the laser light beam include an optical element for focusing light emitted by the laser to said focal point, and the means for contacting the surface selectively define the at least two different distances between the focal point and the optically encoded information.

4. A laser wand for reading optically encoded information as in claim 1, wherein, at a first of said at least two different distances, the diameter of the focussed laser light beam at its point of impact will be smaller than that at a second of said at least two different distances and effective for reading optically encoded information of higher density than that readable at said second of the at least two different distances.

5. A laser wand for reading optically encoded information as in claim 1, wherein the means for contact the surface to selectively define at least two different distances comprise:
   a wand-shaped housing fixedly supporting the means for producing the focussed laser light beam so that the beam of light emerges from one end of the housing; and
   a spacer.

6. A laser wand for reading optically encoded information as in claim 5, wherein the spacer is detachable from the one end of the housing such that the one end of the housing without the spacer defines a first one of the distances and the housing with the spacer mounted on the one end thereof defines a second one of the distances.

7. A laser wand for reading optically encoded information as in claim 5, wherein the spacer slideably mounts on the one end of the housing.

8. A laser wand for reading optically encoded information as in claim 5, wherein the spacer threadable mounts on the one end of the housing.

9. A method of reading optically encoded information comprising:
   producing a focussed laser light beam having a fixed focal point;
   contacting the surface on which the optically encoded information is formed to define a first distance between said focal point of the focussed laser light beam and the optically encoded information;
   directing the focussed laser light beam toward optically encoded information;
   sensing light reflected back from the optically encoded information;
   contacting the surface on which the optically encoded information is formed to define a second distance between the focal point of the focussed laser light beam and the optically encoded information, wherein said second distance is different from said first distance;
   directing the focussed laser light beam toward the optically encoded information; and
   sensing light reflected back from the optically encoded information to fully read the optically encoded information.

10. A method of reading optically encoded information of different densities comprising:
    producing a focussed laser light beam having a fixed focal point;
    contacting a surface on which optically encoded information of a first density is formed to define a first distance between the focal point of the focussed laser light beam and the optically encoded information;
    directing the focussed laser light beam toward optically encoded information of the first density;
    sensing light reflected back and deriving therefrom an electrical representation of the optically encoded information of the first density;
    contacting a surface on which optically encoded information of a second density is formed to define a second distance between the focal point of the focussed laser light beam and the optically encoded information, wherein said second density is different from said first density and said second distance is different from said first distance;
    directing the focussed laser light beam toward the optically encoded information of the second density; and
    sensing light reflected back and deriving therefrom an electrical representation of the optically encoded information of the second density.

11. A laser wand for reading optically encoded indicia comprising:
    a wand shaded housing;
    a light emitter, housed within said housing, for emitting a focussed laser light beam having a fixed point beyond which said light beam diverges, said light beam being directed towards a surface on which said indicia is disposed;
    a spacer capable of alternatively defining a first separation distance and a second separation distance, different from said first separation distance, between said light emitter and said indicia; wherein
    at said first separation distance, said light beam forms a sensing spot of a first size on said surface and effective for reading indicia having a first physical characteristic;
    at said second separation distance, said light beam forms a sensing spot of a second size, larger than the first size, on said surface and effective for reading indicia having a second physical characteristic different from the first physical characteristic.

12. A laser wand according to claim 11, wherein said spacer is coupled to said light emitter.

13. A laser wand according to claim 11, wherein said spacer contacts said surface in defining at least one of said distances.

14. A laser wand according to claim 11, wherein said housing includes:
    an opening, in an outer surface of said housing, through which said light beam is directed, and
    a transparent member between said light emitter and said opening and forming one end of a sealed compartment within which said light emitter is disposed.

15. A laser wand according to claim 11, further comprising a light detector for detecting reflected light from said indicia, wherein said light detector is housed within said housing and disposed within a sealed compartment.

16. A laser wand according to claim 11, further comprising a means for fixing said spacer in a first position to define said first separation distance or in a second position to define said second separation distance.

17. A laser wand according to claim 11, wherein:
    said light beam forms a beam spot on said surface having a first diameter at said first separation distance and having a second diameter, larger than said first diameter, at said second separation distance.

18. A laser wand according to claim 17, wherein:

indicia having the first physical characteristic is of a higher density or smaller size than indicia having the second physical characteristic.

19. A laser wand according to claim 11, wherein:

said housing includes an opening, in an outer surface of a fore end of said housing, through which said light beam is directed, said fore end of said housing has a tapered portion;

said light emitter is fixably mounted in said housing, said spacer is removably coupled to said housing, and said first separation distance is defined with said spacer coupled to said housing, and said second separation distance is defined with said spacer decoupled from said housing.

20. A laser wand according to claim 11, further comprising a second spacer, removably coupled to said spacer, for defining a third separation distance which is different from said first and said second separation distances.

* * * * *